United States Patent [19]
Gutsell et al.

[11] Patent Number: 5,857,790
[45] Date of Patent: Jan. 12, 1999

[54] TAPE PRINTER CAPABLE OF PRINTING FRAMES WITH DIFFERENT SHAPES

[75] Inventors: Graham Scott Gutsell, Harston; Nicholas James Hastings, Cottenham; Ian Morgan George, Cambridge; Martin Christopher Edwards, West Ratting, all of United Kingdom

[73] Assignee: Esselte NV, St. Niklaas, Belgium

[21] Appl. No.: 867,400

[22] Filed: Jun. 2, 1997

[30] Foreign Application Priority Data

Apr. 5, 1996 [GB] United Kingdom .................. 96141452

[51] Int. Cl.⁶ ....................................................... B41J 5/30
[52] U.S. Cl. ............................ 400/615.2; 400/61; 400/76
[58] Field of Search ................................ 480/582, 615.2, 480/586; 400/61, 62, 65, 70, 76

[56] References Cited

U.S. PATENT DOCUMENTS

| 3,844,397 | 10/1974 | Richards ..................................... 197/19 |
| 4,568,951 | 2/1986 | Hasegawa et al. ......................... 346/76 |
| 4,943,936 | 7/1990 | Hirai et al. ................................ 364/519 |
| 5,473,982 | 12/1995 | Hirata et al. .......................... 101/128.4 |
| 5,562,353 | 10/1996 | Handa et al. .............................. 400/615 |
| 5,609,424 | 3/1997 | Sakuragi et al. ...................... 400/615.2 |

FOREIGN PATENT DOCUMENTS

| 0567 233 A1 | 3/1993 | European Pat. Off. . |
| 0573 261 A1 | 6/1993 | European Pat. Off. . |
| 0574 255 A1 | 6/1993 | European Pat. Off. . |
| 0639 813 A2 | 7/1994 | European Pat. Off. . |
| 0716 381 A2 | 12/1995 | European Pat. Off. . |
| 2 150 329 | 10/1984 | United Kingdom . |

Primary Examiner—John Hilten
Attorney, Agent, or Firm—Pennie & Edmonds LLP

[57] ABSTRACT

A tape printing device for printing frames with complicated shapes on a label. The device includes a mechanism for inputting a plurality of characters, selecting a frame from a plurality of frames of different shape, and generating print data for the characters and the selected frame. Also, a print head is used for printing the characters and the frames onto the tape according to the generated print data. Only a small amount of memory is required to represent frames, and the operator is offered a large selection of frames. Instead of storing dot patterns for each frame, each frame is represented with a program which can be executed on the tape printing device to generate the pixel pattern corresponding to the selected frame and to print the selected frame on the receiving medium according to the generated pixel pattern. Since the programs generate the pixel pattern dynamically as required by the operator of the device, less memory is required than prior art devices. Also, a larger selection of frames is offered without increasing the cost of the tape printing device.

15 Claims, 13 Drawing Sheets

TAPE PRINTER CAPABLE OF PRINTING FRAMES WITH DIFFERENT SHAPES

FIELD OF THE INVENTION

The present invention relates generally to a printing device and more particularly to a tape label printing device for printing text and frames with complicated shapes around the text.

BACKGROUND OF THE INVENTION

A tape printing device prints labels that can be used to identify items like files, videotapes and audio cassettes and to facilitate their organization. Some tape printing devices also allow the operator to format the label in accordance with the operator's preferences.

Tape printing devices typically consist of a keyboard with character keys and formatting keys, a controller to create the label with the desired format, spools for holding an image receiving tape, a display for viewing the label prior to printing, a print head to print the label on the tape, a print head driving circuit to control the operation of the print head, a motor to control the movement of tape within the device and a cutting device to cut the label.

Some tape printing devices contain thermal print heads which have a matrix of heating elements. The print head driving circuit selectively activates the heating elements in accordance with the character or symbol to be printed. For example, to print the letter "A" on an image receiving tape, the driving circuit will activate only the heating elements of the matrix on the print head which are located at positions on the matrix corresponding to the letter "A".

An operator of a typical tape printing device types the text with the character keys, selects a format from selections shown on the display, views the label on the display prior to printing and selects a print key on the keyboard to print the label.

Tape printing devices in the prior art provide different formatting features to meet the labelling requirements of the operator. For example, the tape printing device described in EP-A-0 567 233 automatically scales the width of frames and the thickness of underlines according to a detected tape width. The tape printing device described in U.S. Pat. No. 5,562,353 also allows the operator to select the desired width of the frame and thickness of the underlines. Both tape printing devices have a limited formatting ability because they do not offer the ability to print frames with complicated shapes.

Tape printing devices in the prior art also provide more elaborate formatting features. For example, the tape printer described in U.S. Pat. No. 5,579,041 has the ability to print a frame with a complicated shape around text specified by the operator. The device displays a fixed number of frame portions which the operator selects and combines to produce the desired label. The device represents the frame portions as dot patterns which are stored in memory.

The tape printer has two disadvantages. First, the device requires a large amount of memory to represent each frame portion because the frame portions are represented as dot patterns. Second, the device can only offer the operator a limited number of frame portions to select because of the large amount of memory required to represent the frame portions.

SUMMARY OF THE INVENTION

In contrast with the prior art, the present invention requires a small amount of memory to represent frames and offers the operator a large selection of frames. Instead of storing dot patterns for each frame, the present invention represents each frame with a program which can be executed on the tape printing device to generate the pixel pattern corresponding to the selected frame and to print the selected frame on the receiving medium according to the generated pixel pattern. Since the programs generate the pixel pattern dynamically as required by the operator of the device, the present invention requires less memory than the prior art. Because the present invention requires less memory, it can offer a larger selection of frames without increasing the cost of the tape printing device.

The present invention enables the operator of the tape printing device to input a plurality of characters, to select a frame from a set of available frames with different shapes, to store a program for each available frame, to generate print data by executing the program corresponding to the selected frame, and to print the selected frame around some of the plurality of characters on a receiving medium in accordance with the generated print data. This generated print data identifies the pixels on a print head which should be activated to print the desired frame around the plurality of characters on the receiving medium.

The invention also shows how to generate and print the label in many printing cycles such that the device generates a portion of the print data corresponding to a portion of the label in each printing cycle. Preferably the frames which are printed have a left border and a right border, each of which includes both straight lines and curves. The pixels on the print head which are to be activated are identified by executing a function which determines the intersection of the print head with the straight lines of the borders and a function which determines the intersection of the print head with the curves of the borders. The straight lines of the borders are represented by a start point and an end point and the curves of the borders are represented by a start point, an end point and a curvature offset.

It is also possible to automatically determine the width of the receiving medium, or the operator can input the width of the receiving medium, so that the height of the frame can be scaled according to either the automatically determined width or the width which was input by the operator. Alternatively, the thickness of the frame line can be automatically determined or inputted by the operator so that the thickness of the frame lines can be scaled according to either the automatically determined frame line thickness or the line thickness which was inputted by the operator.

The invention allows the desired frame line thickness to be achieved by shifting the intersections of the lines and curves of the borders with the print head according to the desired line thickness. Alternatively, the desired frame line thickness can be achieved by providing an additional thickness parameter on the functions which determine the intersections of the border with the print head.

Thus, symmetrical portions of the frame can be printed with one program instead of storing a program for each portion executed separately to improve the performance and further decrease the memory requirements of the device. This also enables the operator to identify the characters to underline, specify the thickness of the underline and print underlines according to the operator's specifications.

BRIEF DESCRIPTION OF THE DRAWINGS

The accompanying drawings illustrate preferred embodiments of the invention and explain the principles of the invention in conjunction with the summary of the invention stated above and the detailed description stated below. The drawings identify similar or corresponding parts in the different views with similar labels.

DESCRIPTION OF THE PREFERRED EMBODIMENTS

Figure 1:
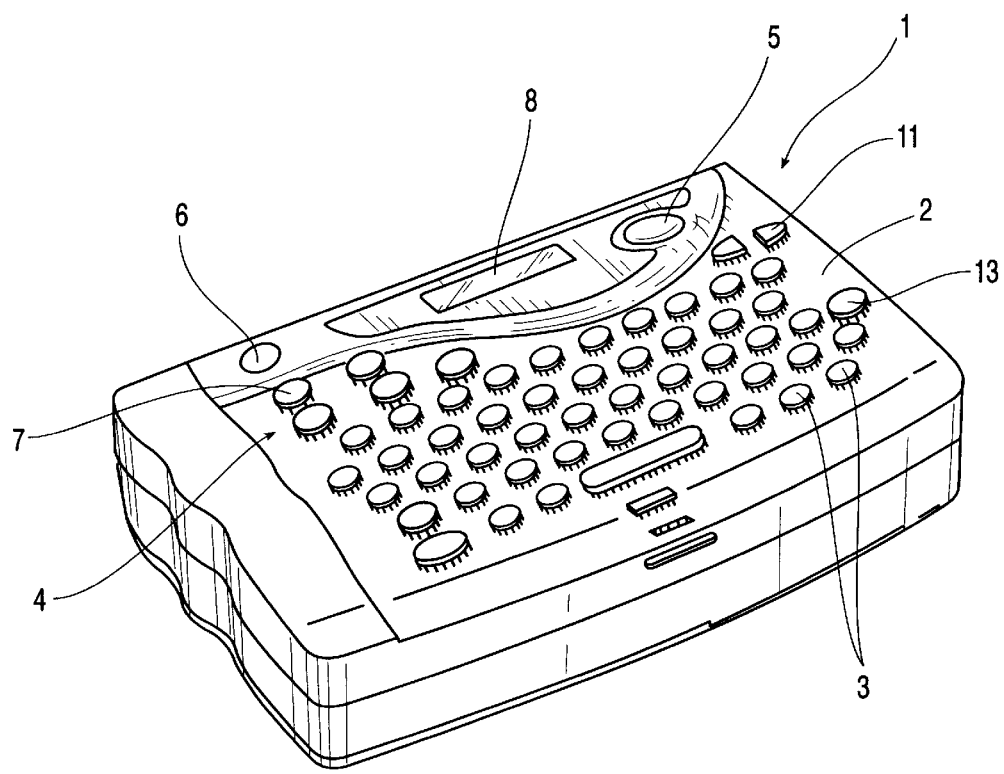
FIG. 1 is a plan view showing the front of a tape printing apparatus.

FIG. 1 shows a simplified plan view of a tape printing device 1. The tape printing device comprises a keyboard 2. The data entry keys 3 of the keyboard 2 including keys for numbers, letters and punctuation marks are used to input the text of a label. Function keys 4 edit the input data. For example, the operator of the tape printing device 1 can use the function keys 4 to change the size or font of the input data. Further, the operator can also use the function keys 4 to underline and frame the label.

Figure 3:
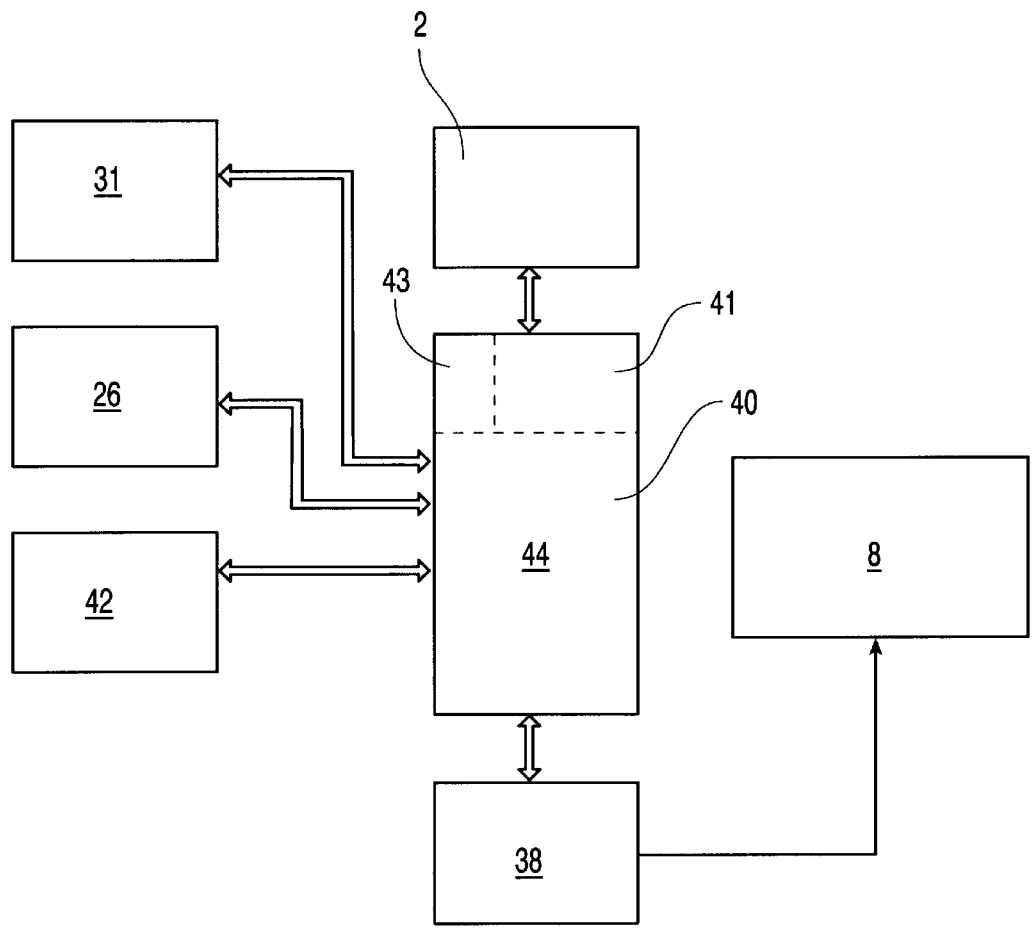
FIG. 3 is a simplified block diagram of control circuitry for controlling the tape printing apparatus of FIG. 1.

The tape printing device 1 has a liquid crystal display (LCD) 8 which displays the data as it is entered by an operator. The display 8 enables the operator to view and edit either the entire label or a portion of the label before printing it. The display 8 can also show messages to the operator including error messages or informational messages. For example, an informational message may indicate that the operator pressed the print key 5. A display driver 38 which is shown in FIG. 3 drives the display 8.

The keyboard also has cursor keys 11 which move a cursor over the display 8. A select key 7 is used to choose a formatting option as explained more fully in the discussion of FIG. 11. The keyboard 2 also has a return key 13 and an on/off key 6 which is used to activate or deactivate the tape printing device 1.

Figure 2:
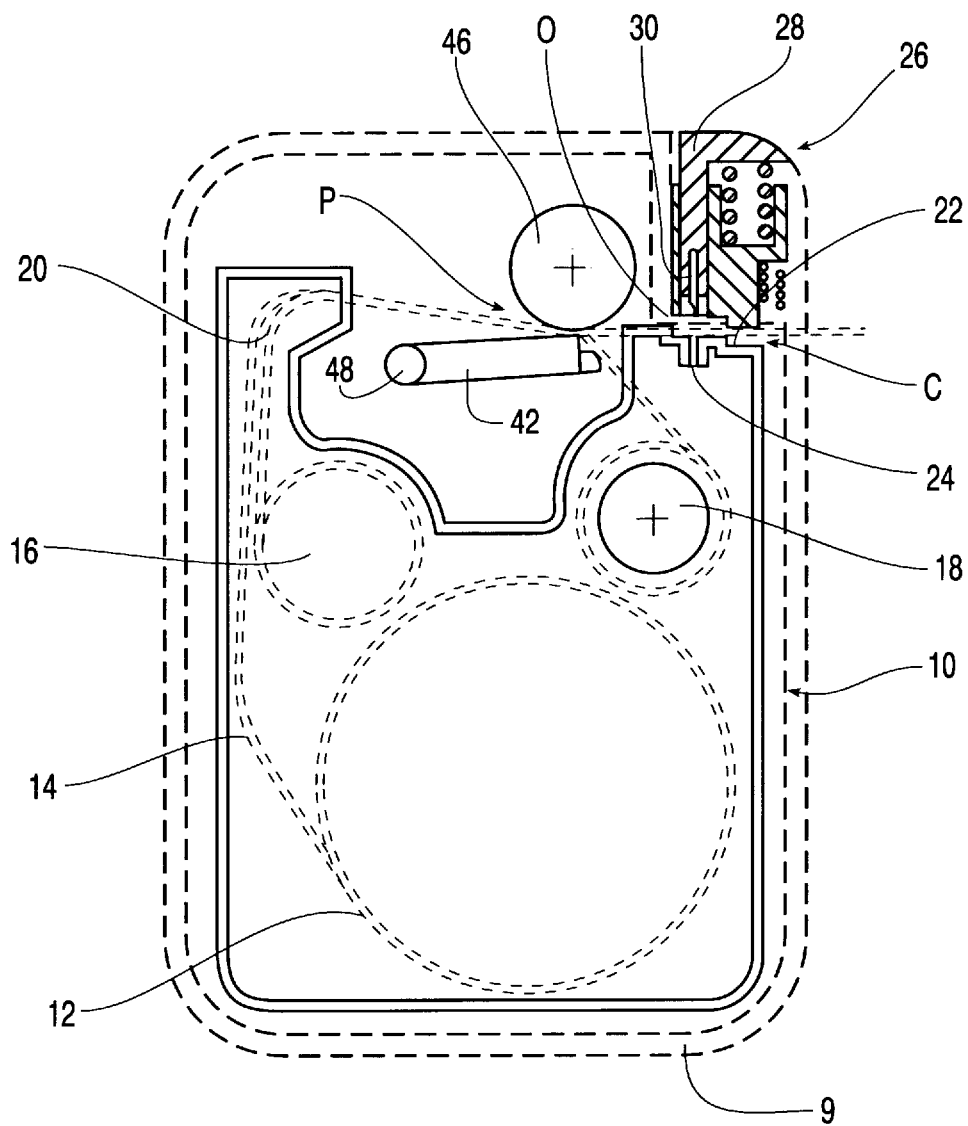
FIG. 2 is a plan view of the underside of the tape printing apparatus of FIG. 1.

As shown in FIG. 2, the underside of the tape printing device 1 has a cassette receiving bay 9. The cassette receiving bay 9 includes a thermal print head 42 and a platen 46 which cooperate to define a print zone P. The print head 42 is pivotable around a pivot point 48 to enable the print head 42 to either move into contact with the platen for printing or to be moved out of contact with the platen 46 to allow removal and replacement of a cassette 10.

A cassette 10 which is inserted into the cassette bay 9 holds a supply spool 12 of image receiving tape 14. The image receiving tape 14 has two surfaces. One surface has an upper layer to receive a printed image. The other surface is coated with an adhesive layer. A releasable backing layer is secured to the adhesive layer. A guiding mechanism whose structure is familiar to those skilled in the art guides the image receiving tape 14 within the cassette 10, to a print zone P through an outlet O of the cassette and to a cutting location C.

An ink ribbon supply spool 16 and an ink ribbon take up spool 18 of the cassette 10 hold an ink ribbon 20. The image receiving tape 14 and the ink ribbon 20 are arranged to overlap as they pass between the print head 42 and the platen 46. In particular, the image receiving layer of the image receiving tape 14 is in contact with the ink ribbon 20 as they pass through the print zone P to print an image on the image receiving tape 14.

A motor 31 as shown in FIG. 3 drives the platen 46. The platen 46 rotates to move the image receiving tape 14 in a direction which is parallel to the lengthwise extent of the image receiving tape through the print zone P. In one set of embodiments, a DC motor could be used to drive the platen. In an alternate set of embodiments, a stepper motor could be used to drive the platen. After the image is printed on the image receiving tape 14, the rotation of the platen moves the image receiving tape 14 from the print zone P to the cutting location C.

In those embodiments where the motor 31 is a DC motor, the image receiving tape 14 is driven continuously through the print zone P during printing. In the alternate embodiments where the motor is a stepper motor, the platen 46 rotates stepwise to drive the image receiving tape 14 in steps through the print zone P during printing.

The cutting location C is located on a portion of the wall 22 of the cassette 10 which is near the print zone P. This wall portion 22 has a slot 24 which enables the image receiving tape 14 to travel from the print zone P to the cutting location C where it is supported by facing wall portions on either side of the slot 24. A cutting mechanism 26 includes a cutter support member 28 which carries a blade 30. The blade 30 enters the slot 24 as it cuts the image receiving tape 14.

The print head 42 is a thermal print head comprising a column of a plurality of printing elements. In the preferred embodiment, the print head 42 is only one printing element wide and the lengthwise direction of the column is perpendicular to the lengthwise direction of the image receiving tape 14. The height of the column of printing elements is preferably equal to the width of the image receiving tape 14. If different image receiving tapes 14 with different widths are used with the tape printing device 1, the height of the column of printing elements is equal to the largest possible width of the image receiving tapes 14.

The print head 42 prints the image on the image receiving tape 14 column by column. In one set of embodiments, an image is printed on the image receiving tape 14 using the ink ribbon 20. In an alternate set of embodiments, an image can be applied directly by the print head 42 to the image receiving tape 14 without using an ink ribbon 20 if the image receiving tape 14 is of a suitable thermally sensible material.

As an alternative to the cassette system shown in FIG. 2 which has one cassette 10, the cassette receiving bay 9 may receive a separate image receiving tape cassette and a separate ink ribbon cassette. The two cassettes in this system are arranged so that the image receiving tape is in contact with the ink ribbon as they pass through a print zone. This cassette system is described in U.S. Pat. No. 5,458,423, the content of which is expressly incorporated by reference thereto. Of course, any other suitable arrangement for providing a supply of image receiving tape can be used with the present invention.

FIG. 3 shows the control circuit for controlling the tape printing device 1 of FIGS. 1 and 2. A microprocessor chip 40 has a read only memory (ROM) 41, a microprocessor 44 and random access memory (RAM) 43. The microprocessor 44 executes programs which are stored in the ROM 41 to control the tape printing device 1. The microprocessor chip 40 is connected to receive data from the keyboard 2. The microprocessor chip 40 outputs data to a display driver chip 38. In accordance with the data received from the microprocessor chip 40, the display driver chip 38 controls a liquid crystal display (LCD) 8 to display either the entire label, a portion of the label, informational messages or error messages.

The microprocessor chip 40 outputs data to drive the print head 42 which prints an image onto the image receiving tape 14 to form a label. The microprocessor chip 40 controls the motor 31 for moving the image receiving tape 14 through the tape printing device 1. The microprocessor chip 40 controls the cutting mechanism 26 to allow portions of the image receiving tape 14 which have received a printed image to be removed.

The ROM 41 stores identifying information relating to the data entry keys 3 and the function keys 4 of the keyboard 2. When a data entry key 3 is depressed, the corresponding identifying code is read from the ROM 41 and written to the RAM 43. The microprocessor 44, in accordance with the data stored in the RAM 43 generates pixel data. The microprocessor 44 outputs the pixel data in one form column by column to the print head 42 and outputs the pixel data in another form to the display 8.

When a function key 4 is depressed, the data corresponding to that function key 4 is read from the ROM 41 and written to the RAM 43. The microprocessor will modify the pixel data which it generates according to the function data which is stored in the RAM 43. Thus, the function keys 4 selected by the operator of the tape printing device 1 will effect the pixel data which are sent to the print head 42 and to the display 8.

Figure 4:
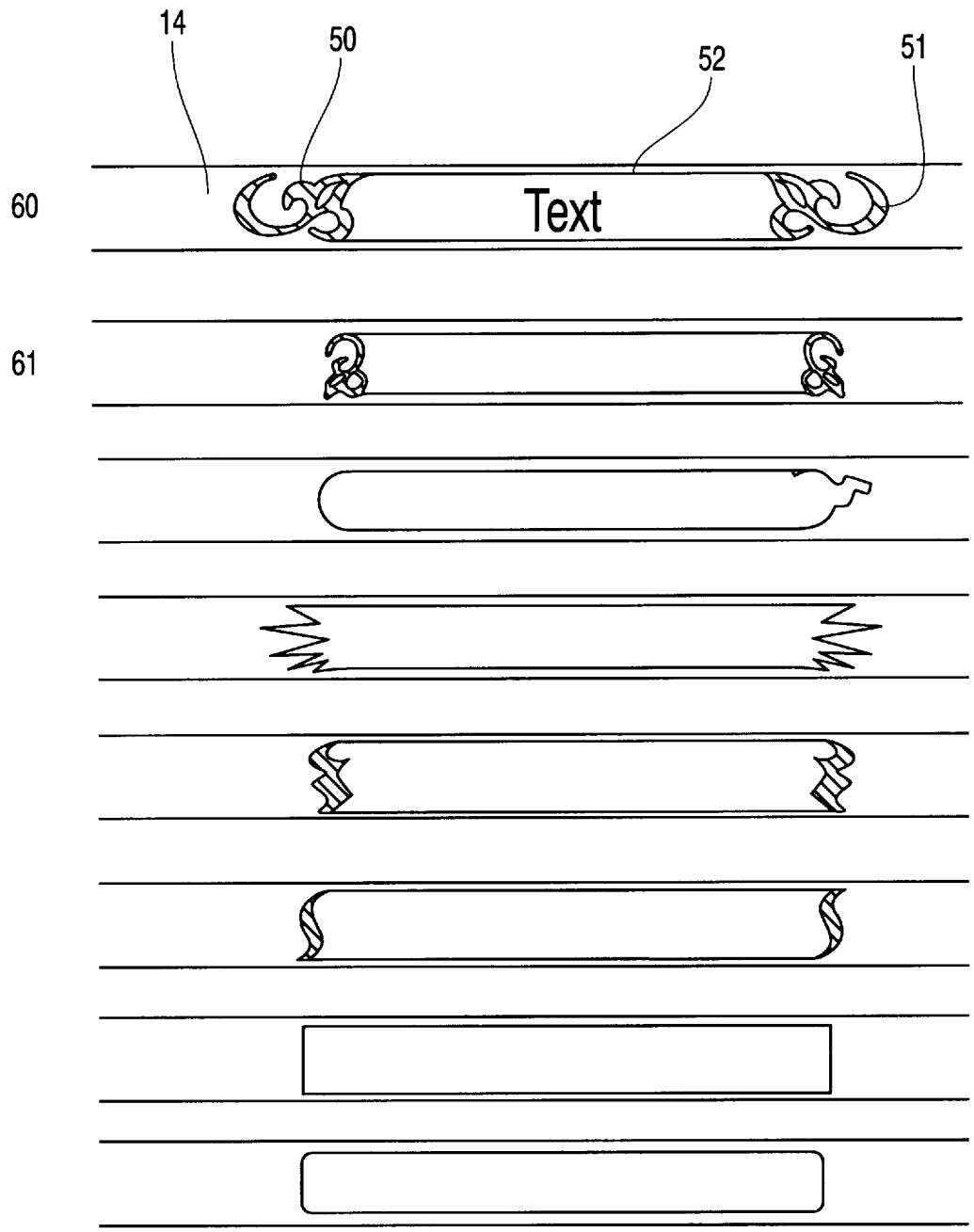
FIG. 4 shows frames which can be produced by means of the tape printing device.

FIG. 4 shows the different styles of frames offered by the tape printing device 1. They consist of a left border 50, which can be complicated, an intermediate part 52, and a right border 51, which can also be complicated. Characters are printed within the intermediate part 52 between straight horizontal lines, which are situated below the characters and above the characters as exemplified by the position of the characters, "TEXT" within the first frame of FIG. 4. The last two frames shown in FIG. 4 are simpler than the first frame. The frame immediately preceding the last frame is a simple rectangle and the last frame is a rectangle with rounded corners. The tape printing device 1 can also print characters outside the frames.

Figure 5:
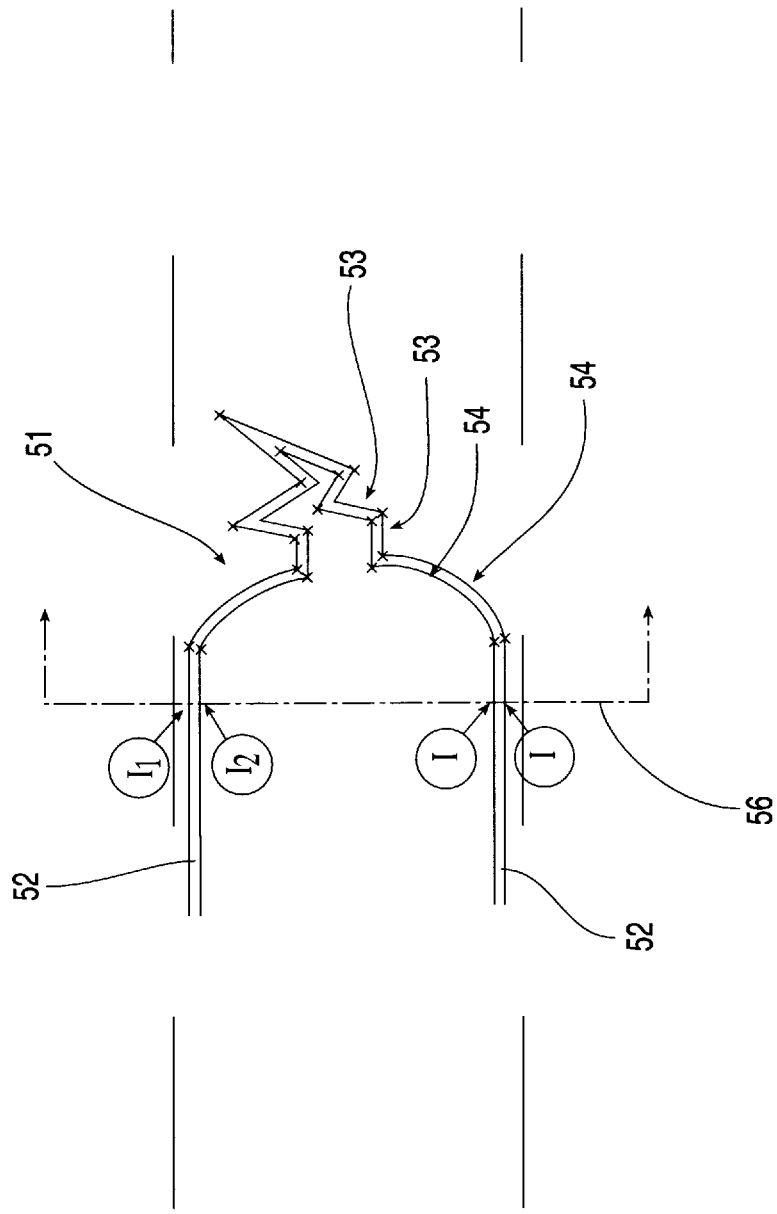
FIG. 5 illustrates how the frames are printed.

FIG. 5 illustrates the method used by the microprocessor chip 40 to control the operation of the print head 42 in accordance with the data entered by the operator using the keyboard 2 to print frames with complicated shapes. The ROM 41 stores information relating to the available complicated left borders 50 and the complicated right borders 51. The outlines of the complicated left border 50 and the complicated right border 51 consist of a series of straight lines 53 and curves 54 which define the outside edges. In FIG. 5, the ends of these lines and curves are indicated by small crosses. The straight lines 53, 54 are expressed in terms of start points and end points. The start points and end points of the straight lines 53, 54 are defined by coordinates on an (x,y) matrix.

The curves 54 are represented in Bezier form. In Bezier form, curves are defined in terms of the (x,y) coordinates of three points called the Bezier data. The Bezier data consist of a start point, an end point and an offset point which is representative of the curvature of the curve. The Bezier equation $$P(t)=(1-t)^2A+2t(1-t)B+t^2C$$

defines a curve P as a function of t where A, B, C are the three points comprising the Bezier data for the curve P(t). The implementation of the Bezier form including the calculation of the offset point is described in detail in U.S. Pat. No. 5,595,450, the content of which is expressly incorporated herein by reference thereto.

In order to generate the pixel data for a frame, the microprocessor 44 executes functions which are stored in the ROM 41. These functions call additional line draw functions and curve draw functions to determine the pixels of the print head 42 which intersect the frame 50, 51. As explained earlier, a print head 42 has a column of printing elements A. A function to generate pixel data could be structured as shown in the example below:

Function DrawBoxStyle1 (scale)
DrawLine (x1,y1,x2,y2,scale);
DrawCurve (x2,y2,x3,y3,x4,y4,scale);
. . .
end;

The DrawLine function takes the coordinates of the start point (x1,y1) and end point (x2,y2) of a line of a complicated border as input parameters and identifies the pixels of the column of pixels A on the print head 42 which intersect the line I. As discussed in more detail below, the DrawLine function uses the scale input parameter to accommodate the different widths of different image receiving tapes which could be used with the tape printing device 1.

Likewise, the DrawCurve function takes the coordinates of the start point (x2,y2) the offset point (x3, y3) and the end point (x4, y4) of a curve of a complicated border as input parameters and identifies the pixels of the column of pixels A on the print head 42 which intersect the curve I. The DrawCurve will also use a scale input parameter to accommodate the different possible widths of the image receiving tape.

The DrawBoxstyle1 function will use the set of intersections of the column of pixels A with the lines and curves of the complicated border to determine the pixels of the print head which should be activated. As shown by FIG. 5, there can be many intersections I between the column of pixels A and the complicated border. The pixels of the column of pixels A of the print head 42 which should be activated are those pixels which are located between two corresponding intersections I.

As the image receiving tape 14 moves relative to the print head 42, the microprocessor 44 executes the DrawBoxStyle1 function for each position of the print head 42 along the portion of the tape containing the frame to determine the intersections I of the straight lines and curves comprising the frame with the print head 42 at that position. The microprocessor 44 sends the pixel data for each position of the print head 42 to a print buffer of the ROM 43 before the data are printed by the print head 42 on the image receiving tape 14. The function will generate pixel data at a different rate than the printing speed of the print head 42. The print buffer accounts for this rate difference.

A process executing on the microprocessor 44 reads data from the print buffer and activates the elements of the print head 42 accordingly. If the motor 31 is a DC motor, the timing of the activation of the elements of the print head 42 may be controlled with an encoder on the shaft of the motor 31 as explained in U.S. Pat. No. 5,608,443, the content of which is expressly incorporated herein by reference thereto. When a stepper motor is used, the microprocessor 44 will synchronize the stepwise activation of the motor 31 with the activation of the elements of the print head 42.

The DrawBoxStyle1 function, the DrawLine function and the DrawCurve function alter the size of the frame in accordance with the value of the scale parameter. The value of the scale parameter is determined by the width of the tape which can either be specified by the operator of the tape printing device 1 or can be automatically detected by the device. For a tape with a larger width, the scale parameter will be larger and the functions will generate a frame with a larger height. For a tape with a smaller width, the scale parameter will be smaller and the functions will generate a frame with a smaller height.

In addition to changing the height of the frame, the functions executing on the microprocessor 44 can also adjust the thickness of the lines and curves of the frame. For example, the functions could create a frame with thicker lines and curves for a frame with a larger width. Similarly, the functions could create a frame with thinner lines and curves for a frame with a smaller width.

Figure 6:
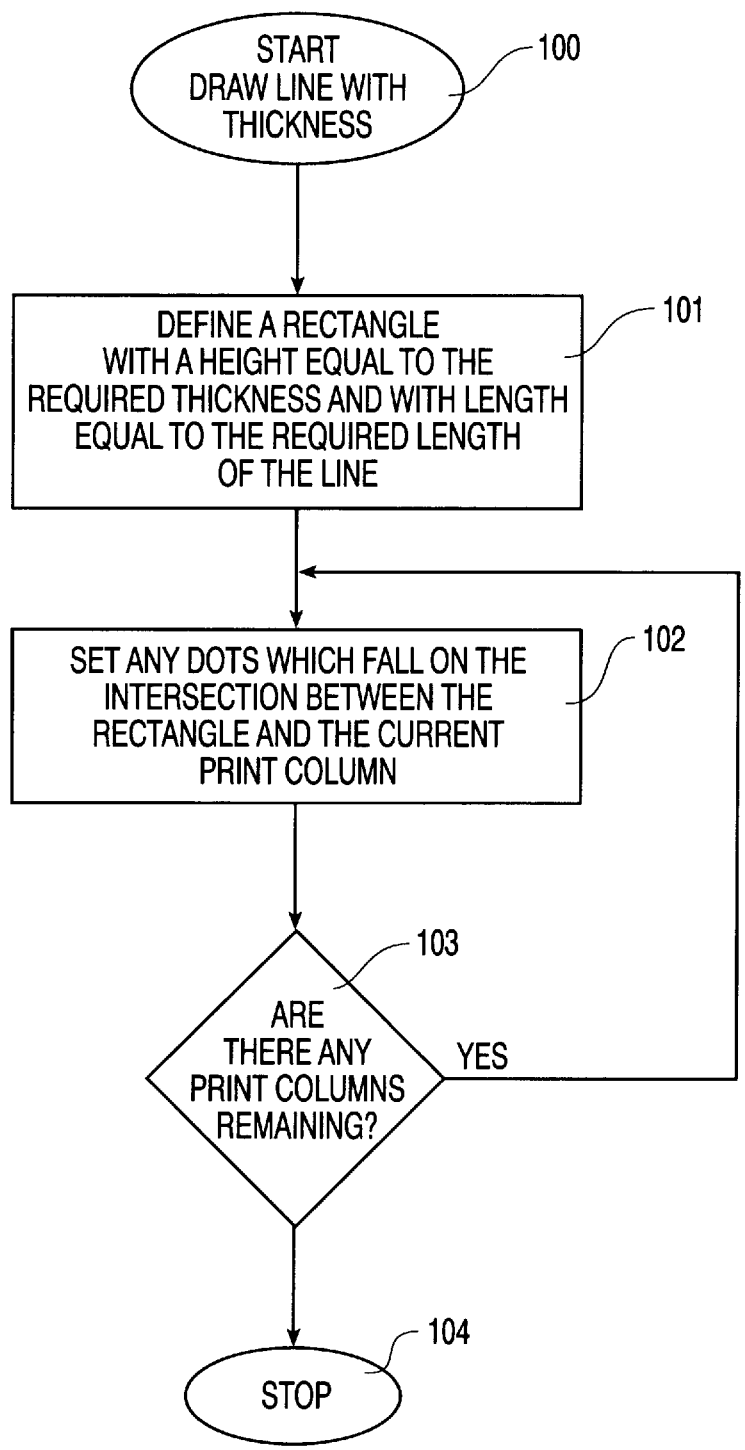
FIG. 6 is a simplified block diagram disclosing how underlines and boxes with different line thicknesses are printed.

FIG. 6 illustrates the operation of a function which adjusts the thickness of lines which could be a portion of the frame or an underline. In step 100, the function begins. In step 101, the function defines a rectangle with a width equal to the desired thickness of the line and with a length equal to the desired length of the line. The RAM 43 stores the width of the rectangle and the length of the rectangle. The tape printing device 1 can print multiple lines simultaneously. For example, the tape printing device 1 can print a label with many lines of underlined text. In this situation, the RAM 43 stores the width and length of each rectangle corresponding to each line of the label.

In Step 101, the function sets the desired width of the rectangle by adjusting the positions of the intersections I shown in FIG. 5. To create a frame with thicker lines, the functions move two corresponding intersections I1, I2 further apart. When two corresponding intersections I1, I2 are moved further apart, the line will be thicker because it will encompass more pixels. To create a frame with thinner lines, the functions move two corresponding intersections I1, I2 closer together. When two corresponding intersections I1, I2 are moved closer together, the line will be thinner because it will encompass fewer pixels. The thickness of the lines of the border can either be selected by the operator of the tape printing device 1 or automatically set by the device in accordance with the width of the border.

A function executing on the microprocessor 44 also sets the thickness of the curves of the complicated borders of the frame in a similar fashion. The function makes a curve thicker by moving corresponding intersections further apart and makes a curve thinner by moving corresponding intersections closer together.

In one embodiment, a set of functions could be stored and executed to achieve the desired thickness of the lines and curves of the frame. All of the members of the set of functions would produce frames of the same type but each member would produce a frame with a different thickness.

In another embodiment, the thickness of the lines and curves of the frame are defined by adjusting the value of the parameters of the DrawLine function and the DrawCurve function respectively. The thickness of the lines and curves of the frame are defined by adding or subtracting an amount which is proportional to the desired thickness to the parameters of the DrawLine and DrawCurve functions as shown below:
Function DrawBoxStyle2 (scale, thickness)
DrawLine (x1+thickness,y1,x2,y2−thickness,scale);
DrawCurve (x2+thickness,y2,x3,y3,x4,y4−thickness,scale);
end;
. . .
end;

In step 102, the function identifies the pixels which fall on the intersection between the stored rectangle(s) and the current print column and stores them in the print buffer of the ROM 43. In step 103, the function determines whether any print columns remain. If there are any print columns remaining, the function will execute step 102 for the next print column. Otherwise, the function ends with step 104. A function similar to the one shown in FIG. 6 is also executed for printing characters on the label since the tape printing device 1 prints characters and underlines simultaneously.

In many cases, the complicated left border 50 and the complicated right border 51 of the frames are symmetrical. For example, in FIG. 4, all frames excluding the third one from the top and the last frame are symmetrical. When the borders are symmetrical, the right border 51 of the frame is produced by mirroring the left border 50 of the frame. This feature saves memory as the ROM 41 and RAM 43 will only need to store data and functions for the left border 50. To implement this feature, the functions have another parameter as indicated below:
Function DrawBoxStyle3 (scale, thickness, mirrored);
. . .
where "mirrored" is a boolean flag indicating whether the complicated borders should be produced mirrored or produced normally.

The DrawBoxStyle1 function will determine the successive sets of intersections of the print head A with the complicated left border of the frame from left to right as shown in FIG. 5. In contrast, the DrawBoxStyle1 function will determine the intersections of the print head A with the complicated right border of the frame from right to left. The function operates from right to left by simply inverting the horizontal coordinates of the left border representation. This method was previously used to produce mirrored images on a stencil sheet as described in U.S. Pat. No. 4,568,951, the content of which is expressly incorporated herein by reference thereto. The same technique is used to show the complicated borders 50, 51 on the display 8 of the tape printing device 1.

Figure 7:
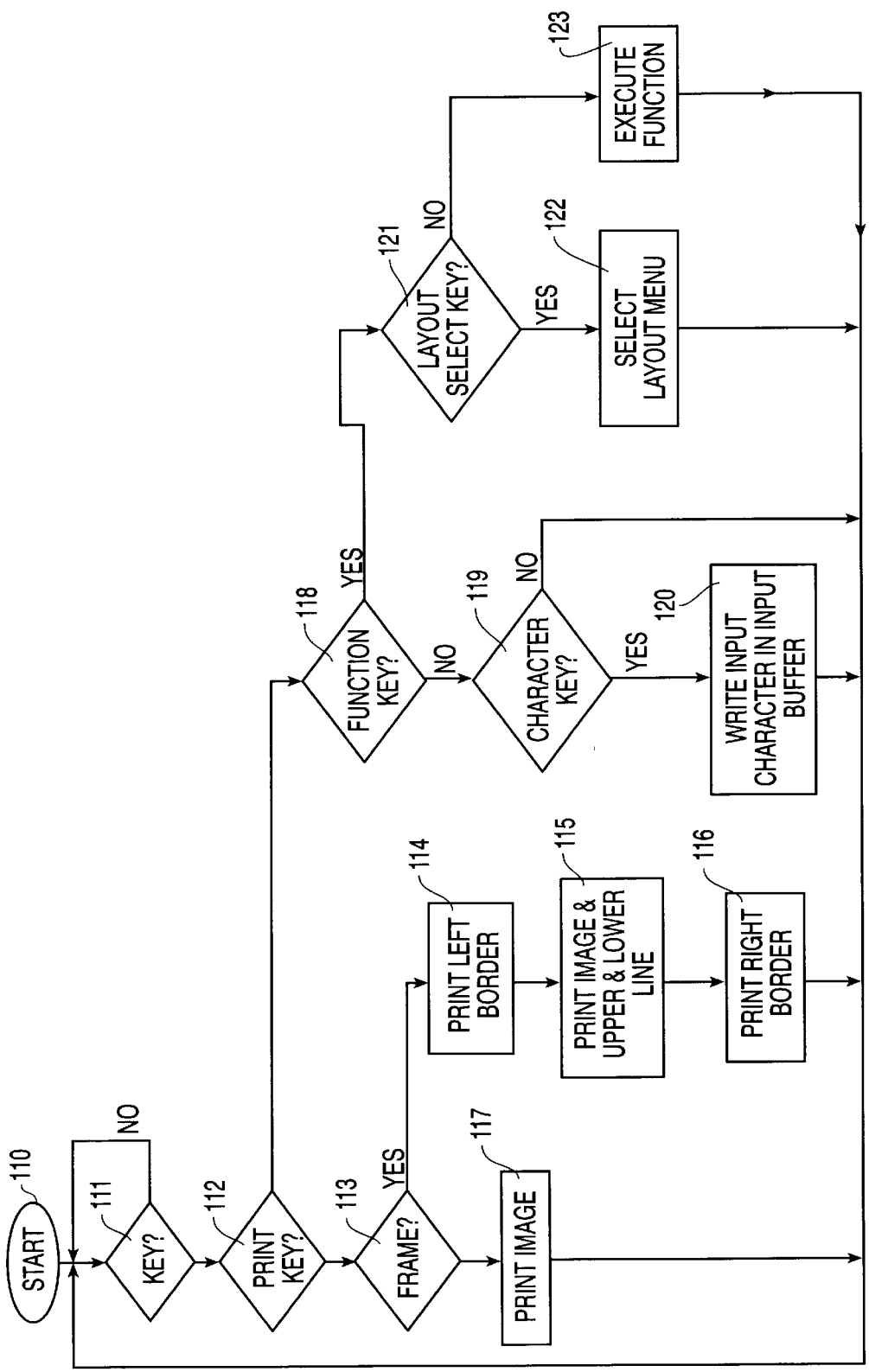
FIG. 7 is a simplified block diagram of the function of the printer.

FIG. 7 illustrates the general operation of the tape printing device 1 in more detail. The tape printing device 1 enters step 110 when the power is activated. In step 110, the microprocessor 44 boots the device by executing a control program stored in the ROM 41. In step 111, this control program determines whether a key 3, 4 on the keyboard 2 has been pressed. If a key 3, 4 has not been pressed, step 111 repeats. If a key 3, 4 is pressed, step 5 determines whether the print key 5 was pressed. If the print key 5 was pressed, step 113 determines whether the image to be printed is a frame. If the image to be printed is not a frame, step 117 prints the image in normal mode without a frame as known and described for example, in U.S. Pat. No. 5,595,450.

If the image to be printed is a frame, the printing will be accomplished in three steps. First, step 114 prints the left border 50 of the frame as described more fully in the discussion of FIG. 8. Next, step 115 prints the intermediate part 52 of the frame as described more fully in the discussion of FIG. 9. Finally, step 116 prints the right border 51 of the frame as described more fully in the discussion of FIG. 10.

After step 117 or step 116, control returns to step 111 to determine whether another key 3, 4 was pressed. If the print key 5 is not pressed as determined in step 112, step 118 determines whether a function key 4 was pressed. If a function key 4 was not pressed, step 119 determines whether a character key 3 was pressed. When a character key 3 was pressed, step 120 writes the character to an input buffer where it is stored for subsequent printing and shows the character on the display 8.

If a character key 3 was not pressed in step 119, control returns to step 111 without any further action since this path through the flowchart will only occur if there is an error. For example, this path will be followed when two keys 3, 4 are pressed simultaneously because the microprocessor 44 cannot determine the appropriate response to this input.

If a function key 4 was pressed as determined in step 118, step 121 determines whether the pressed key was a layout menu select key. A layout menu select key is a special function key 4 which displays a menu for selecting a layout. If a layout menu select key was pressed, the operator of the tape printing device 1 selects a layout as described more fully in the discussion of FIG. 11. If a layout menu select key was not pressed, step 123 executes the function associated with the pressed function key 4. Step 111 follows step 123.

Figure 8:
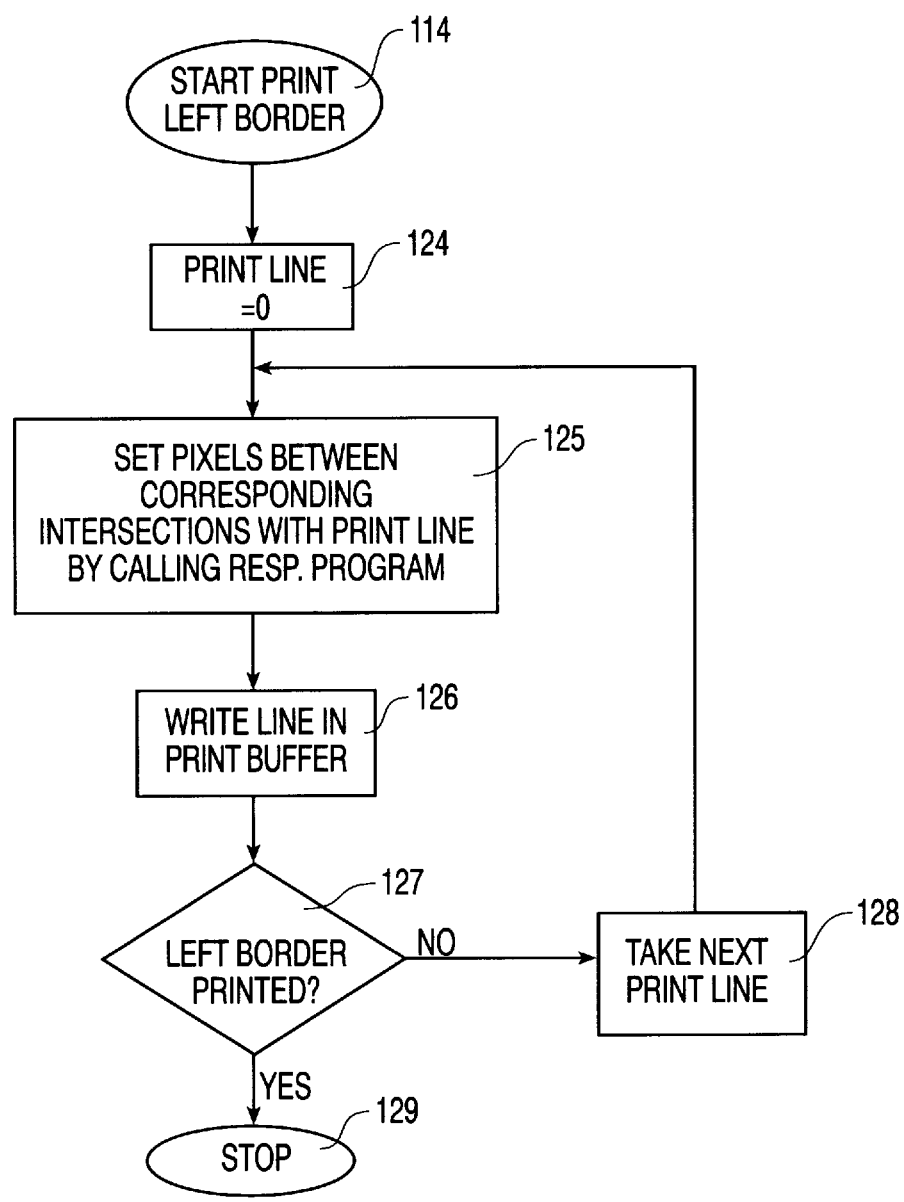
FIG. 8 is a simplified block diagram showing how left borders of frames with complicated parts are printed.

FIG. 8 provides more detail on the printing of left borders in step 114 of FIG. 7. Step 124 sets the print line cursor to 0. Step 125 selects the pixels between each two corresponding intersections with the print line by executing the functions for processing lines and curves as previously explained in the discussion of FIG. 5. The discussion on FIG. 13 below provides more detail on step 125 of FIG. 7. Step 126 stores the pixel data in the print buffer of the ROM 41. Next, step 127 determines whether the pixel data for the entire left border was produced. If pixel data has not been generated for the entire left border, step 128 increments the print line cursor so that step 125 will execute on the next print line. If pixel data for the entire left border has been generated as determined by step 127, the process stops in step 129.

Figure 9:
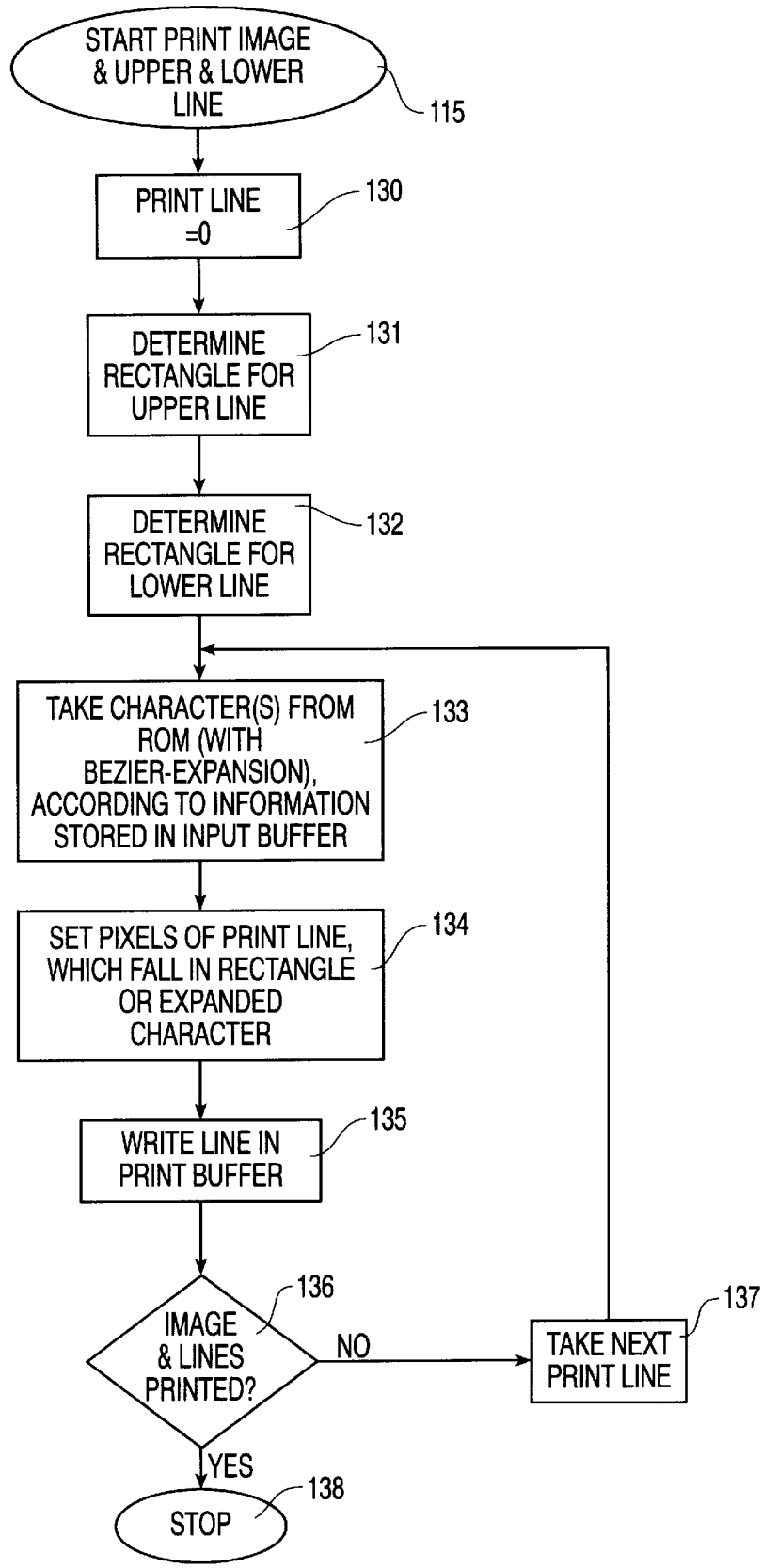
FIG. 9 is a simplified block diagram showing how intermediate (center) parts of frames with complicated parts are printed.

FIG. 9 provides more detail on the printing of the intermediate part 52 of the frame in step 115 of FIG. 7. Step 130 sets the print line cursor to 0. Next, step 131 defines a rectangle corresponding to the upper line of the intermediate part 52 of the frame as previously described in the discussion of FIG. 6. Step 132 performs the same task for the lower line of the intermediate part 52 of the frame.

Step 133 reads the Bezier data associated with one or more characters which are identified in the input buffer of the ROM 41. Step 133 reads Bezier data for each character appearing along the column identified by the print line cursor. Bezier data defines the outline of characters as explained in EP-A-0 574 225, the contents of which are incorporated herein by reference. Since there could be multiple lines of text in the intermediate part 52 of the frame, step 133 could read Bezier data for many characters. Step 120 of FIG. 7 had previously written these characters to the input buffer of the ROM 41 as explained above. Next, step 134 selects the pixels between each two corresponding intersections of the rectangles representing the upper and lower lines of the intermediate part 52 and the outlines of the characters with the print line. Step 135 stores the selected pixels in the print buffer of the ROM 41. Step 136 determines whether the selected pixels of the image and the lines of the intermediate part 52 have been completely stored for printing. If the pixels of the intermediate part 52 have been completely stored, step 137 increments the print line cursor so that step 133 will execute on the next print line. When step 136 indicates that the entire intermediate part is stored for printing, the procedure ends in step 138.

Figure 10:
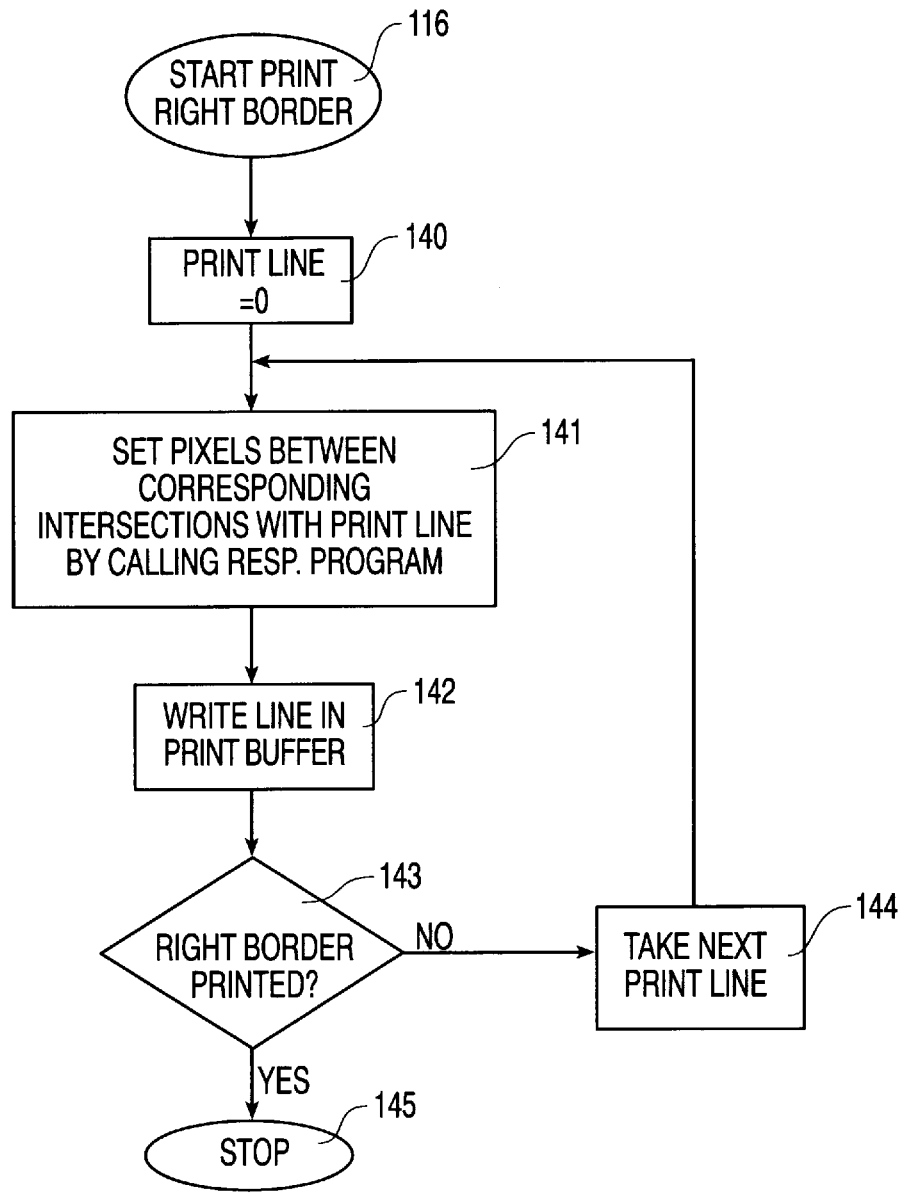
FIG. 10 is a simplified block diagram showing how right borders of frames with complicated parts are printed.

FIG. 10 provides more detail on the printing of the right border 51 of the frame in step 116 of FIG. 7. Step 140 sets the print line cursor to 0. Step 141 selects the pixels between each two corresponding intersections with the print line by executing the functions for processing lines and curves as previously explained in the discussion of FIG. 5. Step 142 stores the pixel data in the print buffer of the ROM 41. Next, step 143 determines whether the pixel data for the entire right border was produced. If pixel data has not been generated for the entire right border, step 144 increments the print line cursor so that step 141 will execute on the next print line. If pixel data for the entire right border has been generated as determined by step 143, the process stops in step 145.

When the left border and the right border of the frame are symmetrical, step 116 of FIG. 7 generates the pixels for the right border by executing the same functions as step 114 of FIG. 7 after inverting the horizontal coordinates of the representation of the left border.

Figure 11:
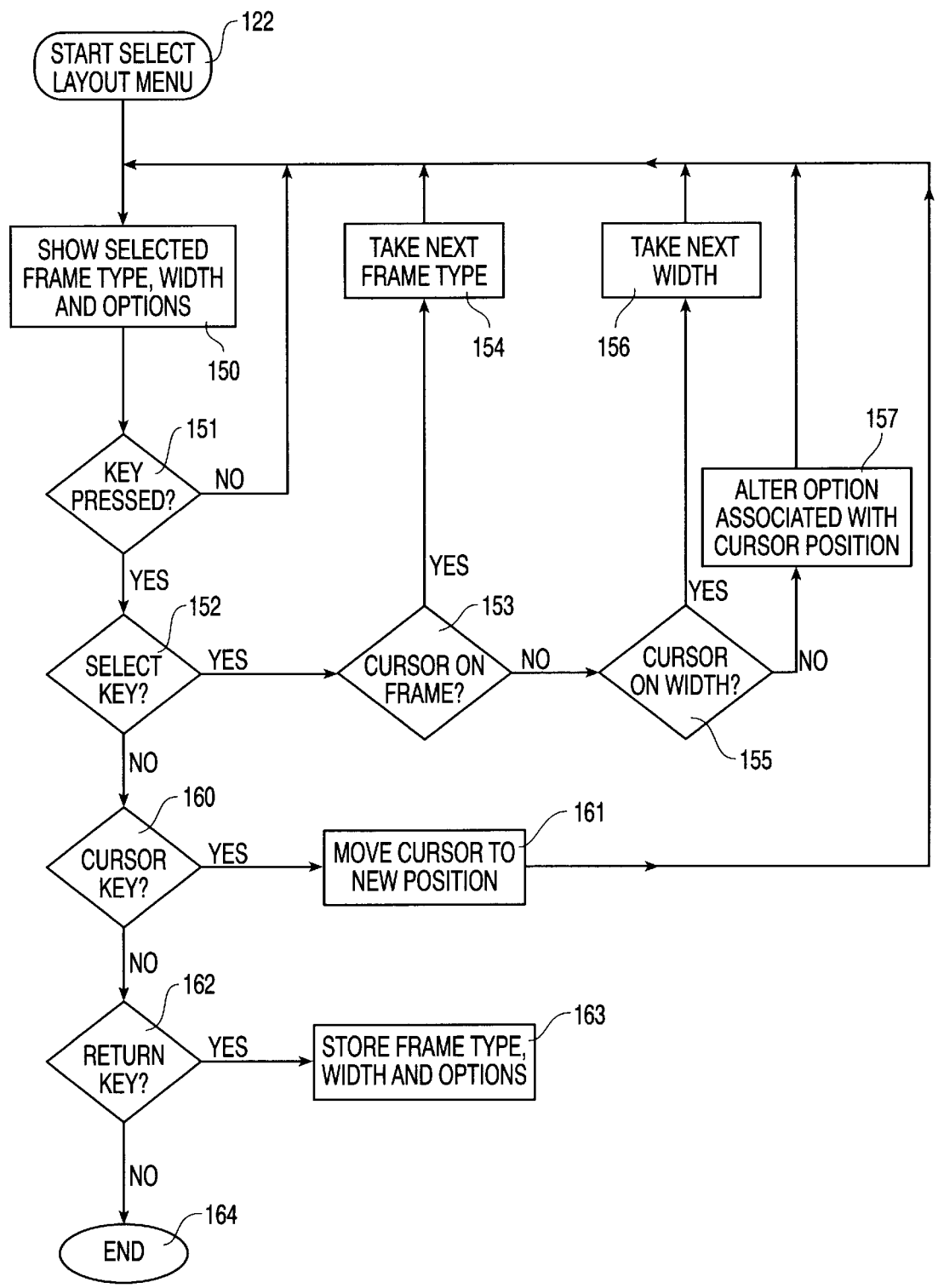
FIG. 11 is a simplified block diagram showing how frame types and widths are selected.

FIG. 11 provides more detail on the layout selection menu of step 122 of FIG. 7. Step 150 displays the available frame types, frame widths, and other parameters on the display 8 as exemplified by the sample of FIG. 12. The parameters include the justification or orientation of the text of the intermediate part 52 of the label. The operator selects a frame type, frame width, justification, etc. from the layout selection menu using the keyboard 2.

Figure 12:
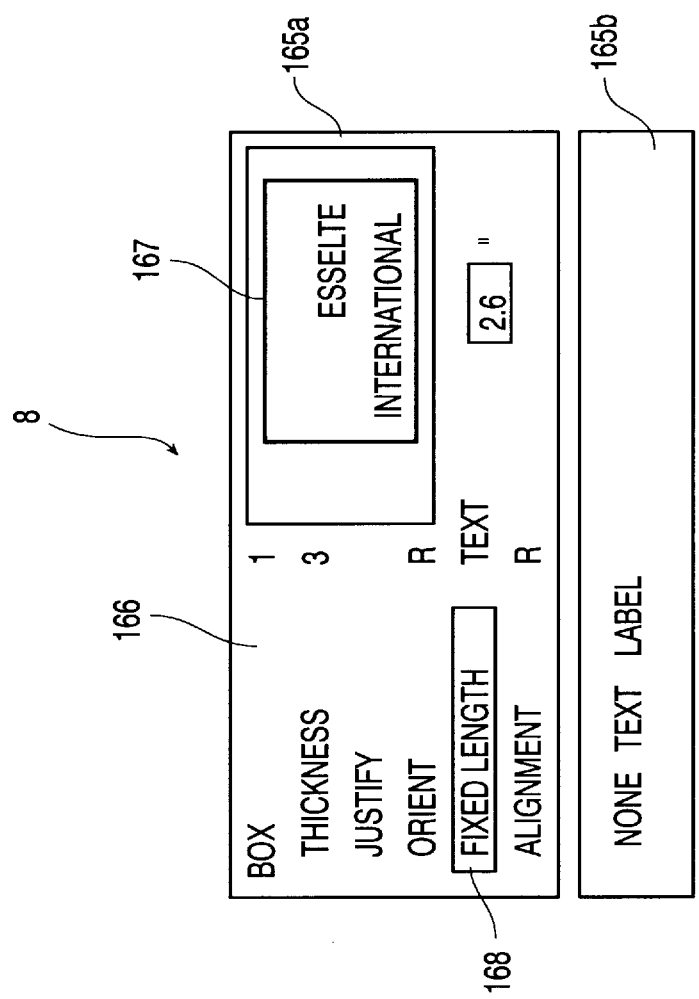
FIG. 12 shows the display of the printer when the layout menu is selected.

Step 151 determines whether a key 3 was pressed. If a key 3 was not pressed, control returns to step 150. Accordingly, the layout selection menu appears on the display 8 until the operator presses a key 3. If a key 3 is pressed, step 152 determines whether the select key 7 was pressed. If the select key 7 was pressed, step 153 determines whether the cursor 168 shown in FIG. 12 is under a frame type field on the display 8. If the cursor 168 is under a frame type field, step 154 moves the cursor 168 to the next frame type on the layout selection menu. Next, step 150 will show the selected frame type on the display 8.

If the cursor 168 is under a frame type field, the operator can scroll through the available frame types by pressing the select key 7. FIG. 4 displays some of the available frame types. The available frame types include a null frame type. If the operator selects a null frame type, the tape printing device 1 will not print a frame around the text.

If the cursor 168 is not under a frame type field as determined by step 153, step 155 determines whether the cursor is under a frame width field. If the cursor is under a frame width field, step 156 selects the next frame width which will subsequently be displayed on the layout selection menu in step 150. Thus, if the cursor 168 is under a frame width field, the operator can scroll through the available frame widths by pressing the select key 7. The available frame widths include an automatic frame width. If the operator selects the automatic frame width, the tape printing device 1 will automatically select the frame width according to the tape width or the character size.

If the cursor is not under a frame width field as determined in step 155, step 157 will alter the position of the cursor of the applicable parameter of the layout selection menu. For example, if the cursor is under the justification field when the operator presses the select key 7, the execution of step

150 following step 157 will show the next justification value (left, center, right, or block) on the display 8.

If the select key 7 is not pressed as determined by step 152, step 160 determines whether a cursor key 11 was pressed. If a cursor key 11 was pressed, step 161 moves the cursor on the display 8 to the next option. Thus, after step 161 is executed, the cursor displayed on the layout selection menu will appear with a new option enabling the operator to scroll through the possibilities associated with this new option using the select key 7.

If the cursor key 11 is not pressed as determined in step 160, step 162 determines whether the return key 13 was pressed. If the return key 13 was pressed, step 163 stores the chosen frame type, frame width and the remaining parameter values in the input buffer. The procedure ends with step 164. If a key other than the return key 13 is pressed such as the escape key, the procedure ends in step 164 without storing the chosen parameter values. Accordingly, the previously selected options will remain valid.

The operator of the tape printing device 1 formats the label by selecting values for a set of parameters which are displayed on the layout selection menu. FIG. 12 shows the layout selection menu as it would appear on the display 8 of the tape printing device 1. The layout selection menu has two parts 165*a*, 165*b*. The upper part 165*a* of the layout selection menu displays the parameters and the lower part 165*b* displays the possible values for the parameter highlighted by the cursor 168. For example, in FIG. 12, the fixed length parameter is highlighted by the cursor 168 in the upper part 165*a* of the layout selection menu. Accordingly, the lower part 165*b* of the layout selection menu of FIG. 12 displays the possible values available for the fixed length parameter.

To select a value from the possible values displayed in the lower part 165*b* of the layout selection menu for a particular parameter, the operator must select that parameter in the upper part 165*a* of the menu. The operator selects the parameter in the upper part 165*a* of the layout selection menu using the cursor keys 11. For example, the operator would press the "up" cursor key 11 three times to highlight the thickness option with the cursor 168 in the first part 165*a* of the layout selection menu. After moving the cursor 168 to the thickness parameter, the operator can select a value for that parameter from the options displayed in the lower part 165*b* of the menu.

The operator selects the value in the lower part 165*b* of the layout selection menu by pressing the select key 7 the appropriate number of times. For example, if the operator desires to select a NONE value for the fixed length parameter, the operator should activate the select key 7 twice because the currently selected value for this parameter is the TEXT value, as shown in FIG. 12.

The layout selection menu enables the operator to format the label by selecting the value of several parameters. First, the operator can set the length of the text of the label to a desired maximum length by choosing the TEXT value for the fixed length parameter. Alternatively, the operator can set the length of the label to a desired maximum length by choosing the LABEL value for the fixed length parameter. The layout selection menu displays the desired maximum length in a box when either the TEXT value or the LABEL value is selected for the fixed length parameter. The operator increments and decrements the value of the desired maximum length using the up cursor key 11 and the down cursor key 11 respectively. Alternatively, the operator can set the desired maximum length using the numbered keys on the keyboard 2. The operator can remove any restrictions on the length of the label or the text by selecting the NONE value for the fixed length parameter. If the NONE value is selected for the fixed length parameter, the length of the text and the label will depend only on the input image.

The operator can select the frame type by choosing the desired order number for the box parameter 166. The layout selection menu displays a sample layout 167 for the selected frame type in the right portion of the upper part 165*a* of the menu as shown in FIG. 12. This display feature enables the operator to view a label before printing it. The tape printing device 1 will update the sample layout 167 on the layout selection menu when the operator selects another frame type. The operator can further define the format of the label using the remaining parameters (JUSTIFY, ORIENT, and ALIGNMENT) as explained in British patent application GB 9614142.9, the content of which is expressly incorporated herein by reference thereto.

Figure 13:
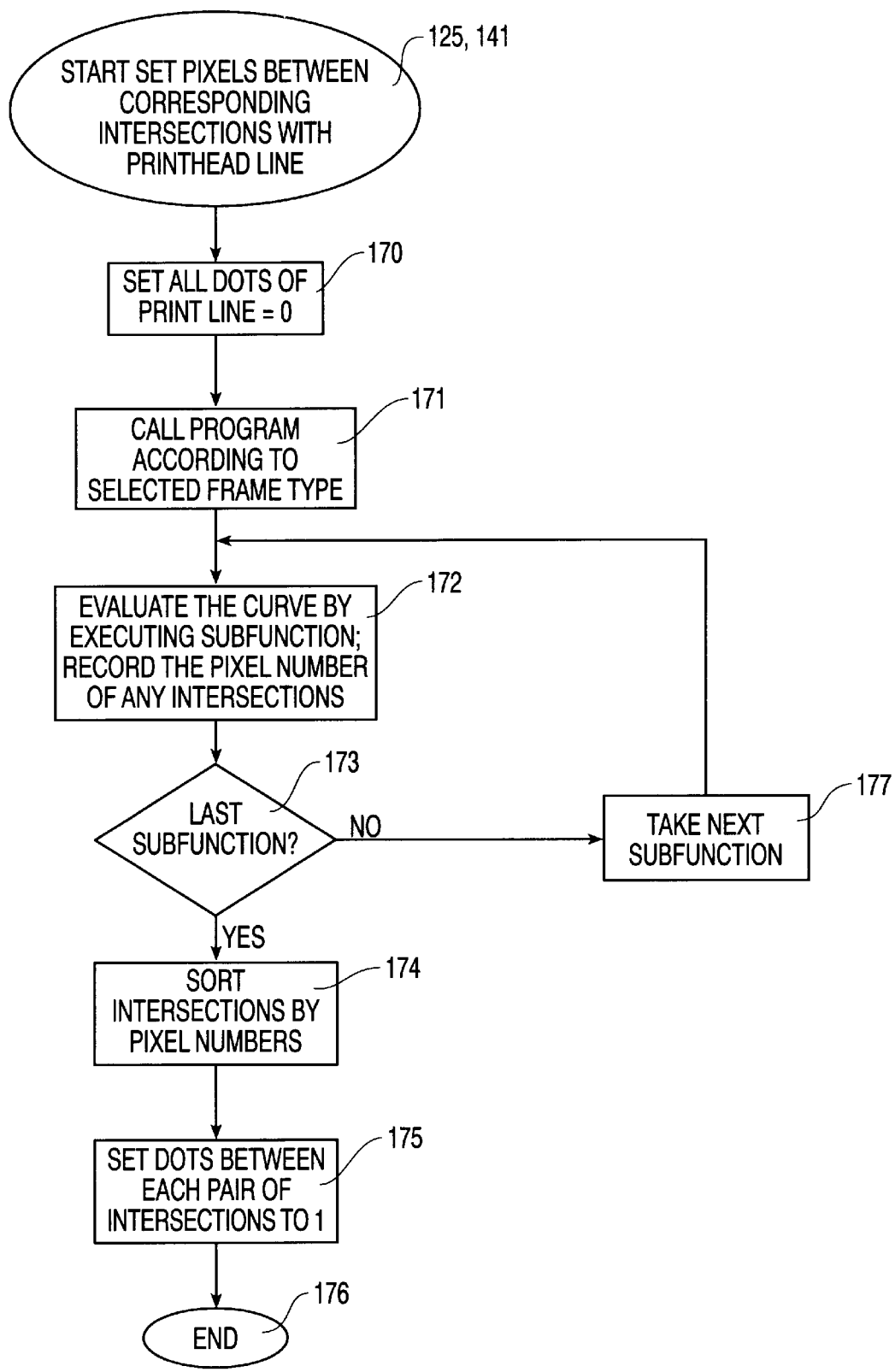
FIG. 13 is a simplified block diagram illustrating the process of printing one line of a complicated part of a frame.

FIG. 13 provides more detail on step 125 of FIG. 8 and step 141 of FIG. 10. These steps set the correct pixels of the printhead line to print the complicated border of the frame of the label. Step 170 follows either step 125 or step 141. Step 170 sets all pixels to zero. Next, step 171 reads the program associated with the selected frame type from the ROM 41. This program consists of several functions as described in the discussion of FIG. 5 above. Step 172 determines the pixel numbers associated with the intersection of the printhead line and a line or curve of the complicated border by executing a DrawLine function or a DrawCurve function respectively with the appropriate parameters. Step 172 stores the pixel numbers of the intersections. Next, Step 173 determines whether the last function of the program has been called and executed. In other words, step 173 determines whether all lines and curves of the complicated border have been processed by step 172. If all lines and curves have not been processed, step 177 identifies the function associated with the next line or curve to be processed by step 172.

If all the lines and curves of the complicated border have been processed as determined in step 173, then the program has determined and stored all the intersections of the printhead line with the complicated border. For example, the program could determine and store pixel numbers 4, 50, 12 and 23 as intersections. Next, step 174 sorts the intersections by increasing value of the pixel numbers. For the example above, step 174 will output the pixel numbers in the following order: 4, 12, 23, 50. Step 175 determines the pixels which are located between each pair of intersections. For the example above, step 175 will set all pixels between pixels 4 and 12 to 1. Similarly, step 175 will set all pixels between pixels 23 and 50 to 1. Step 176 terminates this process.

While the present invention has been described with reference to certain preferred embodiments, the scope of the invention is not limited to these preferred embodiments. One skilled in the art may find variations of these preferred embodiments which fall within the spirit of the present invention whose scope is defined by the claims set forth below.

What is claimed is:

1. A printer for printing a label on a tape comprising:

means for inputting a plurality of characters;

means for selecting a frame from a plurality of frames of different shape;

means for storing a plurality of programs;

means for corresponding each frame with one program of said plurality of programs;

print data generating means for generating print data by executing said corresponding program of said selected frame, said print data generating means executing said program without recalling stored dot pattern data, in order to reduce the required memory capacity; and printing means for printing said selected frame around at least some of said plurality of characters on said tape according to said print data.

2. A printer according to claim 1, wherein:

said printing means includes a print head having a plurality of pixels arranged in a matrix;

said print data generating means generates said print data for said label in a plurality of printing cycles by generating a portion of said print data in each of said printing cycles;

said portion of said print data identifies some of said plurality of pixels on said print head to activate in each of said plurality of printing cycles; and said printing means prints said portion of said label according to said portion of said print data in each of said plurality of printing cycles.

3. A printer according to claim 2, wherein a portion of said frame comprises a left border and a right border defined by straight lines and curves.

4. A printer according to claim 3, wherein said programs of said print generating means further comprise:

a line function for printing straight lines by identifying some of said plurality of pixels located within intersections between said matrix of pixels and said straight lines; and a curve function for printing curves by identifying some of said plurality of pixels located within intersections between said matrix of pixels and said curves.

5. A printer according to claim 4, wherein:

said line function includes parameters representing a start point and an end point of one of said straight lines; and said curve function includes parameters representing a start point, an end point and a curvature offset of one of said curves.

6. A printer according to claim 1, further comprising:

means for obtaining tape width data including one of means for automatically determining tape width and means for inputting tape width; and means for scaling frame height according to obtained tape width data.

7. A printer according to claim 1, further comprising:

means for obtaining frame line thickness data including one of means for automatically determining frame line thickness and means for inputting frame line thickness; and means for scaling frame line thickness according to obtained frame line thickness data.

8. A printer according to claim 7, wherein said automatically determined frame line thickness is dependent on tape width.

9. A printer according to claim 4, further comprising:

means for obtaining frame line thickness data including one of means for automatically determining frame line thickness and means for inputting frame line thickness; and means for scaling frame line thickness according to obtained frame line thickness data.

10. A printer according to claim 9, wherein said automatically determined frame line thickness is dependent on a width of said tape.

11. A printer according to claim 9, wherein said print data generating means shifts said intersections according to obtained frame line thickness data to control said frame line thickness.

12. A printer according to claim 11, wherein said programs of said print data generating means include a parameter representing said frame line thickness.

13. A printer according to claim 1, wherein said print data generating means generates print data for a first portion of said frame symmetrically along an axis of symmetry to a second portion of said frame by reflecting said portion of said print data for said second portion along said axis of symmetry.

14. A printer for printing a label on a tape comprising:

means for inputting a plurality of characters;

means for selecting a frame from a plurality of frames of different shape;

means for selecting some of said plurality of characters to underline;

means for inputting a desired thickness of an underline and a frame width;

printing means for printing said plurality of characters, said selected frame around at least some of said plurality of characters, and said underline with said desired thickness.

15. A printer for printing a label on a tape comprising:

means for inputting a plurality of characters;

means for selecting a frame comprising a left border and right border defined by straight lines and curves, from a plurality of frames of different shape;

means for storing a plurality of programs;

means for corresponding each frame with one program of said plurality of programs;

print data generating means for generating print data for said label in a plurality of printing cycles by generating a portion of said print data in each of said printing cycles; and printing means including a print head having a plurality of pixels arranged in a matrix for printing said selected frame around at least some of said plurality of characters on said tape according to said print data;

wherein said portion of said print data identifies some of said plurality of pixels on said print head to activate in each of said plurality of printing cycles so that said printing means prints said portion of said label according to said portion of said print data in each of said plurality of printing cycles;

wherein said programs of said print generating means include a line function for printing straight lines by identifying some of said plurality of pixels located within intersections between said matrix of pixels and said straight lines; and a curve function for printing curves by identifying some of said plurality of pixels located within intersections between said matrix of pixels and said curves.

* * * * *

UNITED STATES PATENT AND TRADEMARK OFFICE
CERTIFICATE OF CORRECTION

PATENT NO. : 5,857,790

DATED : January 12, 1999

INVENTORS : Graham Scott Gutsell et al.

It is certified that error appears in the above-identified patent and that said Letters Patent is hereby corrected as shown below:

On the title page item [30] change "April 5, 1996" to --"July 5, 1996"--.

Signed and Sealed this

Eighteenth Day of May, 1999

Q. TODD DICKINSON

*Attest:*

*Attesting Officer*                *Acting Commissioner of Patents and Trademarks*